US009501549B1

(12) United States Patent
Wang et al.

(10) Patent No.: US 9,501,549 B1
(45) Date of Patent: Nov. 22, 2016

(54) SCORING CRITERIA FOR A CONTENT ITEM

(71) Applicant: Google Inc., Mountain View, CA (US)

(72) Inventors: Xuerui Wang, Palo Alto, CA (US); Gaofeng Zhao, Cupertino, CA (US)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 14/263,554

(22) Filed: Apr. 28, 2014

(51) Int. Cl.
*G06F 17/30* (2006.01)

(52) U.S. Cl.
CPC ............... *G06F 17/30587* (2013.01)

(58) Field of Classification Search
CPC ............... G06F 17/30864; G06F 17/30867; G06Q 30/02
USPC ............... 707/748, 740, 769, 756; 382/158; 386/278
See application file for complete search history.

(56) References Cited

U.S. PATENT DOCUMENTS

| | | | | |
|---|---|---|---|---|
| 7,822,631 B1* | 10/2010 | Vander Mey | ..... | G06F 17/30038 705/7.29 |
| 8,392,249 B2 | 3/2013 | Koningstein | | |
| 8,682,142 B1* | 3/2014 | Boskovitz | ............ | G11B 27/034 386/278 |
| 8,880,540 B1* | 11/2014 | Sampson | ........... | G06K 9/00463 707/756 |
| 9,047,283 B1* | 6/2015 | Zhang | ................ | G06F 17/30663 |
| 9,208,444 B1* | 12/2015 | Zheng | ................ | G06Q 30/0201 |
| 2006/0026147 A1 | 2/2006 | Cone | | |
| 2008/0235085 A1 | 9/2008 | Kovinsky | | |
| 2010/0185664 A1* | 7/2010 | Baggott | .............. | G06F 17/3089 707/769 |
| 2010/0306249 A1* | 12/2010 | Hill | ................... | G06F 17/30867 707/769 |
| 2013/0055309 A1 | 2/2013 | Dittus | | |
| 2014/0236953 A1* | 8/2014 | Rapaport | ............... | G06Q 10/10 707/740 |
| 2014/0369596 A1* | 12/2014 | Siskind | ............... | G06F 17/3079 382/158 |

* cited by examiner

*Primary Examiner* — Jeffrey A Burke
*Assistant Examiner* — Thong Vu
(74) *Attorney, Agent, or Firm* — Fish & Richardson P.C.

(57) ABSTRACT

Methods, systems, and apparatus, including computer programs encoded on a computer storage medium, for scoring criteria for content items. In one aspect, a method includes identifying a primary ranking signal and a set of auxiliary ranking signals for ranking a set of criteria for a content item. A primary score and a set of auxiliary scores can be identified for each particular criterion in the set of criteria. Each auxiliary score can be adjusted to generate adjusted auxiliary scores. The adjusting can include applying, to at least a portion of the auxiliary scores, a transformation function that reduces an amount of skewness among the auxiliary scores. A ranking score can be determined for each particular criterion based on a function of the primary score for the particular criterion and the adjusted auxiliary scores.

20 Claims, 5 Drawing Sheets

SCORING CRITERIA FOR A CONTENT ITEM

BACKGROUND

The Internet enables access to a wide variety of resources. For example, video, audio, web pages directed to particular subject matter, news articles, images, and other resources are accessible over the Internet. The wide variety of resources that are accessible over the Internet has enabled opportunities for content distributors to provide content items with resources that are requested by users. Content items are units of content (e.g., individual files or a set of files) that are presented in/with resources (e.g., web pages). An advertisement is an example of a content item that advertisers can provide for presentation with particular resources, such as web pages and search results pages. An advertisement can be made eligible for presentation with specific resources and/or resources that are determined to match specified distribution criteria, such as distribution keywords.

SUMMARY

This specification describes technologies relating to scoring criteria for serving content items.

In general, one innovative aspect of the subject matter described in this specification can be embodied in methods that include the actions of identifying a primary ranking signal and a set of auxiliary ranking signals for ranking a set of criteria for a content item; for each particular criterion in the set of criteria: identifying a primary score representing a value of the primary ranking signal for the particular criterion; identifying a set of auxiliary scores for the particular criterion, each auxiliary score representing a value of an auxiliary ranking signal of the set of auxiliary ranking signals for the particular criterion; adjusting each auxiliary score in the set of auxiliary scores to generate adjusted auxiliary scores, the adjusting comprising applying, to at least a portion of the auxiliary scores, a transformation function that reduces an amount of skewness among the auxiliary scores; and determining a ranking score for the particular criterion based on a function of the primary score for the particular criterion and the adjusted auxiliary scores, the function suppressing effects of adjusted auxiliary scores that do not exceed a specified value and boosting the ranking score using adjusted auxiliary scores that exceed the specified value; selecting one or more criteria in the set of criteria for which to associate the content item based on the ranking score for each particular criterion; and providing the content item in response to receiving data specifying one or more of the selected criteria. Other embodiments of this aspect include corresponding systems, apparatus, and computer programs, configured to perform the actions of the methods, encoded on computer storage devices.

These and other embodiments can each optionally include one or more of the following features. In some aspects, determining the ranking score for the particular criterion can include combining the transformed auxiliary scores to generate a combined auxiliary score. The function can include a function of the primary score and the combined auxiliary score.

In some aspects, determining the ranking score for the particular criterion can include increasing the ranking score if the combined auxiliary score exceeds a specified value. Determining the ranking score for the particular criterion can include adding the combined auxiliary score to a constant value to generate an adjusted auxiliary score; and determining a product of the adjusted auxiliary score and the primary score.

Aspects can include assigning the auxiliary scores to two or more groups based on a type of auxiliary ranking signal for each auxiliary score; determining, for each group, a combined auxiliary score for the group based on auxiliary scores assigned to the group; and applying a respective weighting factor to the combined auxiliary score for the group. The respective weighting factor for a particular group can be based on relative importance of the group's auxiliary scores. The function can include a function of the primary score and the combined auxiliary score for each group.

Aspects can include determining, for each particular auxiliary ranking signal, a maximum value of auxiliary scores for the auxiliary ranking signal, the maximum value being based on values of the auxiliary scores for the auxiliary ranking signal across the set of criteria and being less than a highest auxiliary value for the auxiliary ranking signal across the set of criteria; identifying a particular auxiliary score for the auxiliary ranking signal that represents a value for the auxiliary ranking signal and that has a value that exceeds the maximum value; and reducing the particular auxiliary score to a value that is equal to or less than the maximum value. Aspects can include normalizing auxiliary scores for each auxiliary ranking signal.

Particular embodiments of the subject matter described in this specification can be implemented so as to realize one or more of the following advantages. A ranking score for distribution criteria can take into account many different ranking signals without penalizing criteria (e.g., reducing the ranking score for the criteria) that have a very low or no score for one or more of the signals. Criteria that have sufficiently high scores for one or more ranking signals can receive a boost (e.g., an increase) to their ranking scores. Distribution criteria that have high performance scores, for example due to popularity among many content items, can be fairly ranked with criteria that have little available performance data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
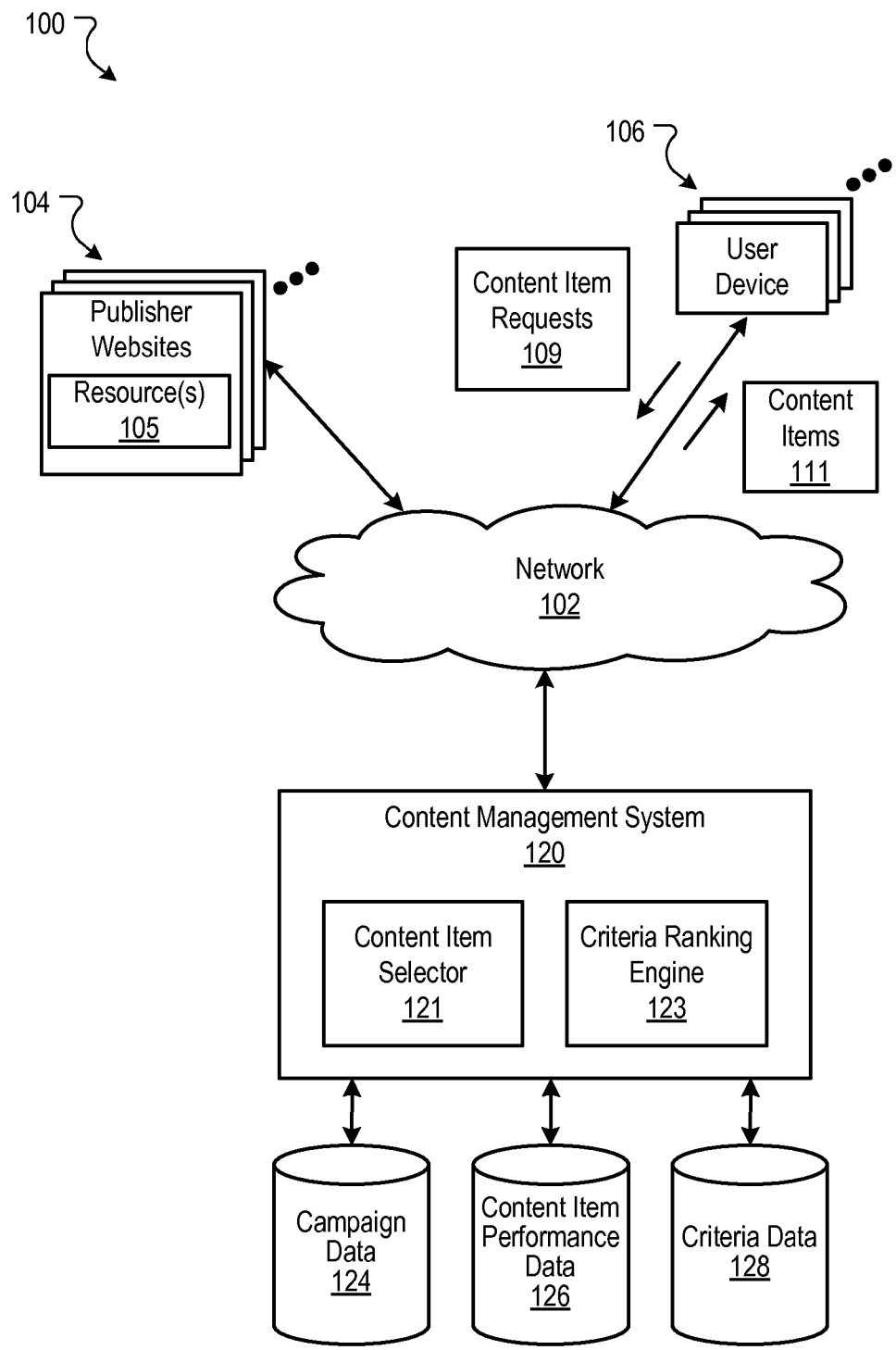
FIG. 1 is an example environment in which a content management system provides content items.

Distribution criteria for content items can be scored and/or ranked using scores for multiple ranking signals for each criterion. Distribution criteria for an advertisement may include different types of criteria that each has different types of ranking signals. In particular, the criteria for an advertisement may include keywords for which the advertisement is eligible to be provided, web pages on which the advertisement is eligible to be presented, location data, time data, particular verticals, and/or particular channels. Each type of criteria can have different types of ranking scores. For example, keywords may have an associated impression count, click-through rate, and/or conversion rate based on data regarding advertisements provided in response to the keywords. In contrast, a web page may have an associated page view count, authority score, and/or unique viewer count.

The different criteria can be scored and ranked for a particular content item using the scores for the different ranking signals. In some implementations, a ranking score is determined for each criterion using scores for that criterion. The ranking scores for the criteria can be based on a primary score and one or more auxiliary scores. For a particular content item, the primary score may be the same across all of the criteria. For example, the primary score for each criterion (e.g., keyword, web page, vertical, etc.) may be a semantic score that represents the semantic relevance between the criterion and the content item. The auxiliary scores can include other scores for the criteria, such as click-through rates, conversion rates, page view counts, and so on. From the ranking scores, one or more criteria can be selected for distributing the content item. For example, one or more keywords with high ranking scores may be selected for distributing the content item.

As some of the criteria have auxiliary ranking signals that differ from the auxiliary ranking signals of other criteria, the ranking scores can be determined such that unavailable auxiliary scores do not penalize the ranking score for its corresponding criterion. For example, consider a ranking score that takes into account a page view score. As keywords may not have an associated page view score, it would be unfair to keywords to reduce the ranking score for the keywords based on a non-existent page view score or a page view score of zero. Criteria scoring and ranking techniques described herein can account for the absence of scores across the criteria for a content item. The techniques can also account for skewness in auxiliary scores for particular auxiliary ranking signals.

The primary ranking signal used to determine the ranking scores may be a signal that affects the ranking score fundamentally or a signal that is important for a particular content item. For example, the primary ranking signal may be a semantic signal that is based on the semantic relevance between criteria and the content item. The primary ranking signal may be boosted by auxiliary ranking signals that have a sufficient value, e.g., a value that exceeds some threshold.

The auxiliary ranking signals may be other signals that reflect the performance or importance of the criteria for the content item. For example, the auxiliary ranking signals can include click-through rates, conversion rates, impression counts, page rank scores, and/or user reach. The scores for the auxiliary signals can be used to boost the ranking score if the auxiliary scores have a sufficient value (e.g., exceeds a threshold or specified value) or if the auxiliary scores have sufficient strength (e.g., at least a threshold amount of data used to determine the score). The auxiliary scores may also be adjusted such that the auxiliary scores do not penalize the ranking score for a criterion if the auxiliary scores are low (e.g., less than a threshold or specified value) or if the auxiliary scores do not have sufficient strength (e.g., less than a threshold amount of data used to determine the score).

The auxiliary scores may be adjusted to reduce skewness and outliers, and to make the auxiliary scores comparable to each other. For example, the auxiliary scores may be transformed using a transformation function to reduce skewness, as discussed in more detail below. The auxiliary scores for a particular auxiliary ranking signal may be capped at a particular value to reduce the number of extremely high scores. For example, the impression counts for most keywords may be in the range of 1,000-10,000. However, some keywords may have millions of impressions. In this example, the impression count may be capped at 10,000 and impression counts above 10,000 may be reduced to 10,000. In addition, the auxiliary scores for each particular auxiliary ranking signal may be normalized to allow for better comparison between the auxiliary ranking signals.

FIG. 1 is a block diagram of an example environment 100 in which a content management system 120 provides content items. A computer network 102, such as a local area network (LAN), wide area network (WAN), the Internet, or a combination thereof, connects publisher websites 104, user devices 106, and the content management system 120. The environment 100 may include many publisher websites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource 105 is any data that can be provided by the publisher 104 over the network 102 and that is associated with a resource address. Resources 105 include HTML pages, word processing documents, and portable document format (PDF) documents, images, videos, online games, maps, and feed sources, to name just a few. The resources 105 can include content, such as words, phrases, pictures, and so on, and may include embedded information (such as meta information and hyperlinks) and/or embedded instructions (such as scripts).

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

A user device 106 can request resources 105 from a website 104. In turn, data representing the resource 105 can be provided to the user device 106 for presentation by the user device 106. The data representing the resource 105 can include resource content (e.g., text, images, videos, etc. of the resource 105) and content item slots (e.g., advertisement slots). When a resource 105 having a content item slot is requested by a user device 106, the content management system 120 receives a content item request 109 requesting content items to be provided with the resource content.

A content item request 109 can include data regarding the resource 105 on which the content item will be presented (e.g., category or keywords found on the resource, data regarding publisher of resource, etc.), and/or other data. If the content items 111 are to be presented in content item slots of a search results page, the content item request 109 may include keywords of a search query submitted to a search system.

The content management system 120 includes a content item selector 121 that facilitates the distribution of content items 111 with the resources 105. Content items 111 can include advertisements, text, images, videos, newsletters, coupons, documents, or another type of content item. The content management system 120 allows content item providers, e.g., advertisers, to define distribution criteria that take into account attributes of the particular resource with which a content item 111 will be presented for purposes of selecting a content item 111 for presentation with the resource.

Example distribution criteria include keyword-based criteria for which content item providers provide bids for keywords. These bids are used to select a content item provider that will provide a content item 111 for presentation at a user device 106. For example, when a particular keyword is matched by a search query submitted from a user device 106 or matched by web page content requested from the user device 106, the content items 111 that are associated with the particular keyword are selected by the content item selector 121 as eligible content items to be provided to the user device. In turn, the bids for the keywords corresponding to each of the eligible content items can be used to determine which content item 111 will be presented. Distribution criteria that are used to select content items 111 for distribution can also include data specifying particular web pages, web pages of a particular content category or vertical (e.g., sports, news, business, gardening, and so on), location, time or day, distribution channels (e.g., channels of a video sharing site), and/or criteria related to users that may view the content item 111.

The content management system 120 includes, or is communicably coupled to, a data storage system that stores campaign data 124, performance data 126, and distribution criteria data 128. The campaign data 124 stores, for example, content items, the distribution criteria for the content items, and budgeting information for content item providers. The performance data 126 stores data indicating the performance of the content items that are served. Such performance data can include, for example, click-through rates for content items 111, the number of impressions for content items 111, and the number of conversions for content items 111. Other performance data can also be stored.

The campaign data 124 and the performance data 126 can be used as input parameters to a content item selection process, e.g., an advertisement auction. For example, the content item selector 121, in response to each request 109 for content items 111, can conduct an auction to select content items ill that are provided in response to the request 109. The content items 111 are ranked according to a rank score that, in some implementations, is proportional to a value that is determined based on a content item bid and one or more parameters specified in the performance data 126. A set of the highest ranked content items in the auction (e.g., based on the rank scores) are selected and provided to the requesting user device.

The distribution criteria data 128 stores data related to distribution criteria. The distribution criteria data 128 can include, for example, click-through rates, click counts, impression counts, conversion rates, conversion counts, authority scores for web pages, page view counts for web pages, unique user counts for web pages (e.g., the number of unique users that viewed the web page), brand scores, and/or user reach (e.g., the number of users that viewed a web page or submitted a query that included a keyword) for distribution criteria. The data for a particular criterion can be across all content items presented in response to the criterion and/or for particular subsets. For example, a keyword may have an associated impression count based on the total number of content items presented in response to receipt of a content item request that specified the keyword. The keyword may also have an associated impression count for each individual content item (or group of content items, e.g., in an ad campaign) presented in response to receipt of a content item request that specified the keyword.

The content management system 120 also includes a criteria ranking engine 123. The criteria ranking engine 123 can rank criteria for use in distributing content items 111. For example, an advertiser may want to determine which criteria performs best or should be used to condition the distribution of an advertisement. The criteria ranking engine 123 can identify, score, and/or rank criteria for the content item using multiple ranking signals. The criteria ranking engine 123 can then select criteria for use in distributing the content item based on the score or ranking, or provide a ranked list of criteria to the content item provider for selection. The criteria that is ranked for a particular content item may include a set of criteria for which the content item is eligible, for example, criteria selected by the content item provider. Or, each available criterion may be ranked regardless of eligibility for the content item.

The ranking score for each criterion may be based on one or more primary ranking signals and one or more auxiliary ranking signals. The primary ranking signal(s) used to determine the ranking score may be specific to the content item, content item group, or the content item provider. The content item provider may select a primary ranking signal based on trust in the signal or based on goals for a content item campaign (e.g., an advertisement campaign). For example, a content item provider may trust a semantic score as a primary indicator of the future performance of a content item. In this example, the content item provider may select the semantic score as the primary ranking signal. In another example, the content item provider may want to expand the user reach of a content item to promote awareness of a product, service, or event that is the subject of the content item. In this example, the content item provider may select user reach as the primary ranking signal.

The auxiliary ranking signals can include ranking signals other than the primary ranking signal for the criteria. For example, the auxiliary ranking signals can include click-through rates, click counts, impression counts, conversion rates, conversion counts, page rank scores for web pages, brand scores, user reach, and/or semantic scores (e.g., of not the primary ranking signal) for the distribution criteria.

The criteria ranking engine 123 can use the primary ranking signal(s) and the auxiliary signals for the distribution criteria to rank the distribution criteria for a particular content item. After the distribution criteria are ranked, one or more criteria may be selected for use in distributing the content item.

Figure 2:
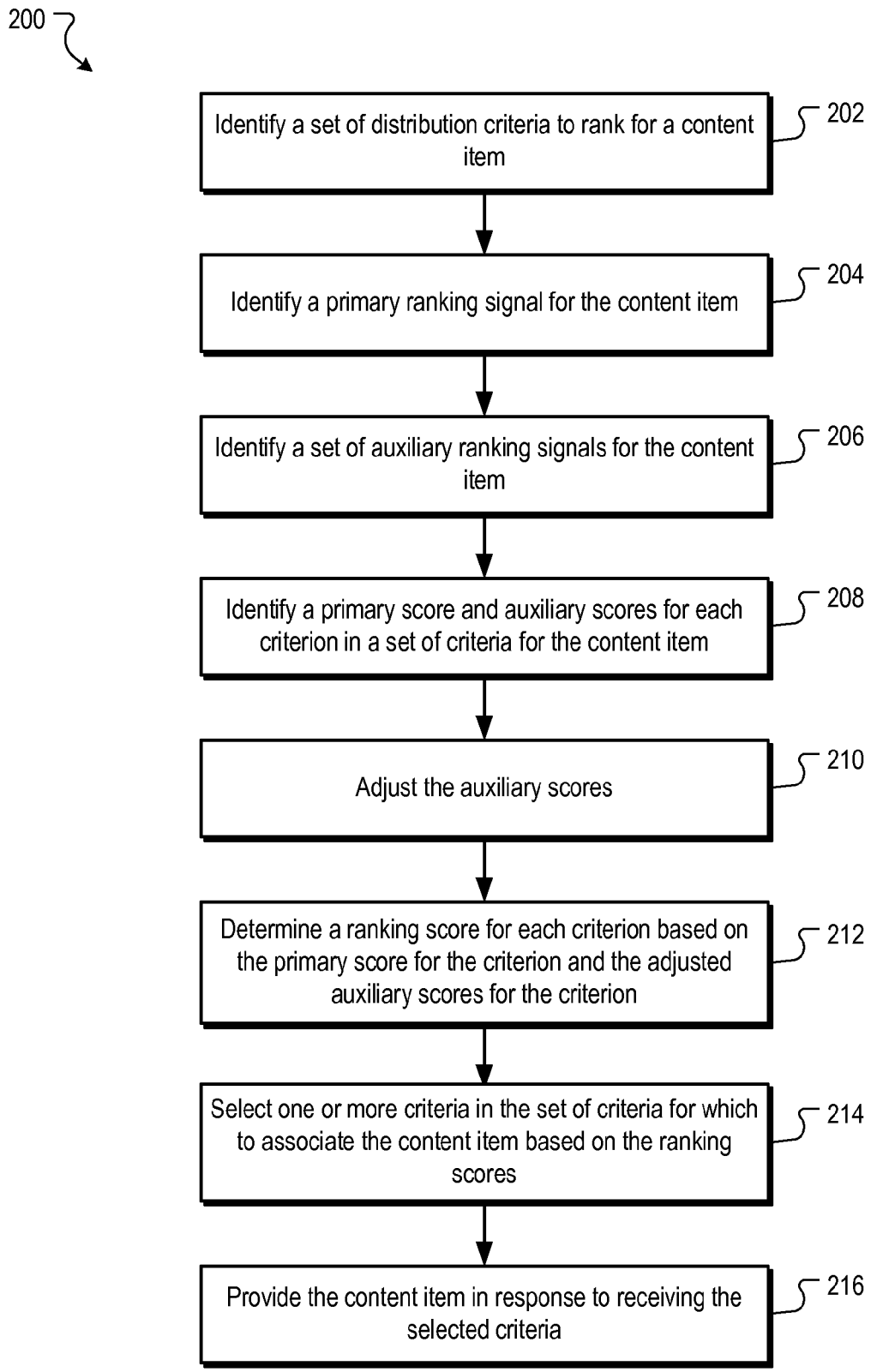
FIG. 2 is a flow diagram of an example process for ranking distribution criteria for a content item and providing the content item.

FIG. 2 is a flow diagram of an example process 200 for ranking distribution criteria for a content item and providing the content item. Operations of the process 200 can be implemented, for example, by a data processing apparatus, such as the content management system 120 of FIG. 1. The process 200 can also be implemented by instructions stored on computer storage medium, where execution of the instructions by a data processing apparatus cause the data processing apparatus to perform the operations of the process 200.

At block 202, a set of distribution criteria is identified for ranking. The set of distribution criteria may be criteria that may be used to distribute a content item and the criteria may be ranked for that content item. In some implementations, the set of distribution criteria can include distribution criteria that, when matched by data included in a content item request, cause the content item to be eligible for distribution. For example, the set of distribution criteria may include distribution criteria selected by a content item provider. In this example, the distribution criteria may include keywords or data identifying web pages for which the content item provider has placed a bid for presenting the content item. In some implementations, the set of distribution criteria may include all criteria available for distributing the content item regardless of whether the criteria has been selected by the content item provider. For example, the set of distribution criteria may include keywords or web pages for which the content item provider has not placed a bid for presenting the content item.

At block 204, a primary ranking signal is identified for the content item. The primary ranking signal is the main signal used for each criterion to rank the criteria for the content item. For example, the ranking score for each criterion may be determined by boosting the score for the primary ranking signal using scores for certain auxiliary ranking signals. In some implementations, a content item provider may select the primary ranking signal for the content item or a content item group that includes the content item. For example, the content item provided may want to increase the number of impressions for the content item. In this example, the content item provider may select an impression count as the primary ranking signal. By way of another example, the primary ranking signal may be the same for all content items. For example, the content item provider may want to increase the number of conversions in an advertisement campaign. In this example, the content item provider may select conversion rate as the primary ranking signal for the content item provider's advertisements.

At block 206, a set of auxiliary ranking signals are identified for the content item. The set of auxiliary ranking signals may include a predefined set of auxiliary ranking signals, for example, selected by the content item provider. Or, the set of auxiliary ranking signals may include the auxiliary ranking signals available for each criterion that is eligible for ranking for the content item. For example, each criterion may be associated with auxiliary scores for a group of auxiliary ranking signals. The auxiliary signals for which at least one criterion of the eligible criteria has an associated auxiliary score may be included in the set of auxiliary ranking signals. For example criterion A may be a keyword that has an associated click-through rate. Criterion B may be a web page that has an associated page view count. In this example, the auxiliary ranking signals may include click-through rates and page view counts.

At block 208, a primary score and one or more auxiliary scores are identified for each criterion of the set of distribution criteria. The primary score for a particular criterion corresponds to the primary ranking signal. For example, if the primary ranking signal is semantic relevance, the primary score for the particular criterion may be a semantic score that represents the semantic relevance between the particular criterion and the content item.

Similarly, each auxiliary score for the particular criterion corresponds to one of the auxiliary ranking signals. For example, if an auxiliary ranking signal is a click-through rate, the auxiliary score for the particular criterion may be a click-through rate for the particular criterion. Some criteria may not have an auxiliary score for one or more of the identified auxiliary ranking signals. For example, a keyword may not have an authority score. In such cases, the auxiliary score for the auxiliary ranking signal may be zero or undefined.

At block 210, the auxiliary scores are adjusted. In some implementations, the auxiliary scores, or a portion thereof, are adjusted to reduce skewness. For example, if there is a significant amount of skewness in the auxiliary scores (e.g., greater than a threshold skewness in a probability distribution function of the auxiliary scores) for a particular auxiliary ranking signal, a transformation function may be applied to the auxiliary scores. The transformation function can include a logarithmic function, a square root function, or is another transformation function. For example, if the value of an auxiliary score is "x", the transformation function may be $Log(x)$, $Sqrt(x)$, or $(1-1/(x-a))$, where "a" is a constant that is less than "x".

The auxiliary scores can also be capped and/or normalized. For example, the auxiliary scores for a particular auxiliary ranking signal, e.g., impression count, may be capped at a particular capped value to remove extremely high values for the particular auxiliary ranking signal. Auxiliary scores that exceed the particular capped value may be reduced to the capped value or a value close to that of the capped value, e.g., 99% of the capped value. For example, if the capped value is 10 million impressions and the number of impressions for a distribution criterion is 11 million, the number of impressions for the distribution criterion is may be reduced to 10 million.

Figure 3:
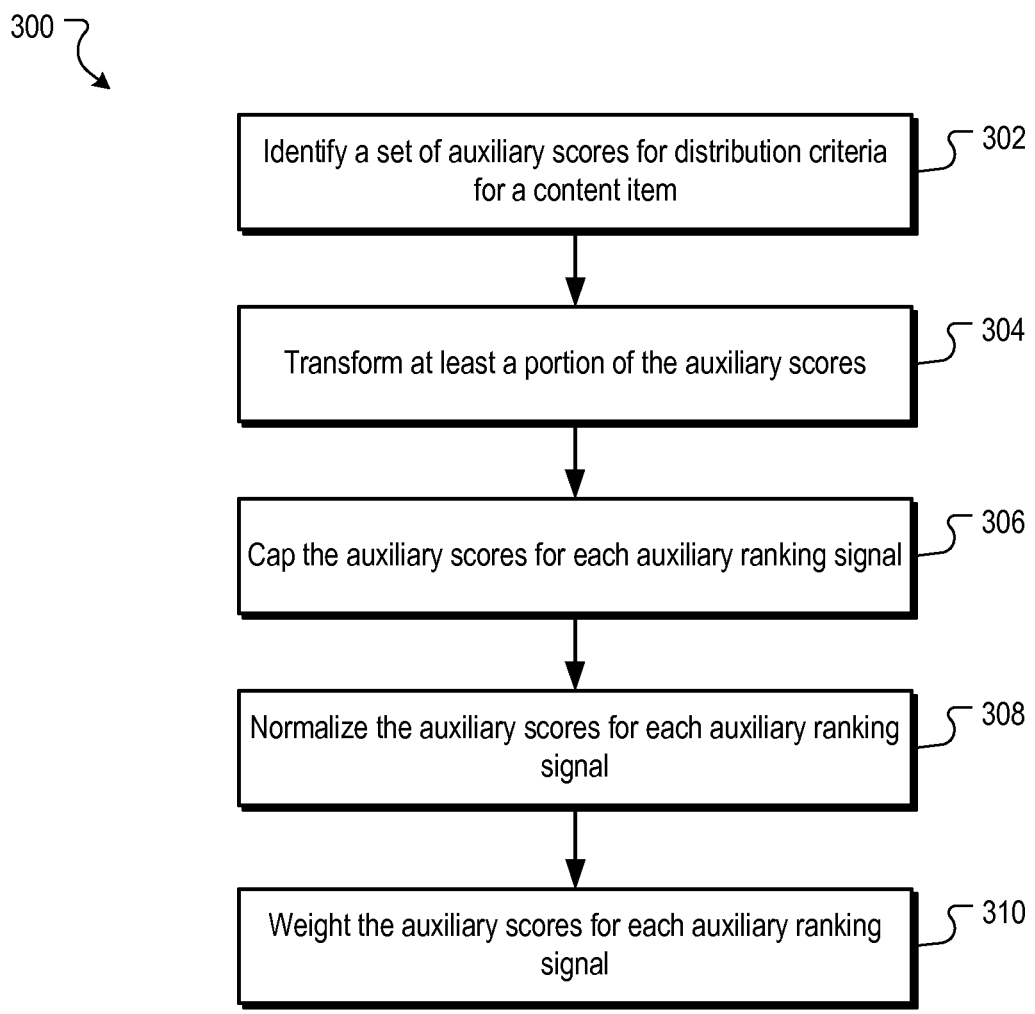
FIG. 3 is a flow diagram of an example process for adjusting auxiliary scores for content item distribution criteria.

The auxiliary scores may be capped before normalizing the auxiliary scores to reduce distortion caused by extremely high values in the normalization. The auxiliary scores for each auxiliary ranking signal may be normalized to a common range of values, such as from a value of zero to a value of one. An example process for adjusting auxiliary scores for content item distribution criteria is illustrated in FIG. 3 and described below.

At block 212, a ranking score is determined for each criterion based on the primary score for the criterion and the adjusted auxiliary scores for the criterion. The ranking score for a particular criterion may be a function of the primary score for the criterion and the adjusted auxiliary scores for the criterion. The function may be configured such that adjusted auxiliary scores that are very low (e.g., less than a specified value) do not penalize (e.g., reduce) the ranking score. For example, a new criterion may not have a score for one or more of the auxiliary ranking signals. In this example, the criteria ranking engine 123 may not penalize the criterion based on the lack of auxiliary scores. Instead, the function may use the adjusted auxiliary scores that are available or that meet a specified threshold to boost ranking scores. For example, the ranking score for a criterion that has a high click-through rate may be boosted based on the high click-through rate.

The ranking score for a particular criterion may be based on a product of the primary score for the particular criterion and the adjusted auxiliary scores for the particular criterion. In order to boost ranking scores for criteria that have sufficient adjusted auxiliary scores without penalizing insufficient auxiliary scores, the adjusted auxiliary scores may be added to a constant value, e.g., a value of one. For example, the ranking score "$R_i$" for criterion (i) may be equal to or proportional to a product of the primary score "$P_i$" for the criterion and each adjusted auxiliary score "$A_i$" for the criterion as shown in Relationship (1) below:

$$R_i = P_i * (1+A_{i1}) * (1+A_{i2}) \ldots * (1+A_{in}) \qquad \text{Relationship (1)}$$

In this way, the value for an adjusted auxiliary score in Relationship (1) can be limited to a value one when the actual value of the adjusted auxiliary score has a value of zero. Adjusted auxiliary scores that have a higher value, e.g., a value of one, can boost ranking score as the adjusted auxiliary score would have a value of two in Relationship 1.

In some implementations, the adjusted auxiliary scores are combined into one or more combined auxiliary scores. The adjusted auxiliary scores may be grouped based on the type of auxiliary ranking metric, e.g., irrespective of the value of the scores. For example, there may be a group for performance-related scores (e.g., click-through rates and conversion rates) and another group for ratings (e.g., page rank scores and content rating scores). A combined auxiliary score can then be determined for each group. The combined auxiliary score for a group may be an average of the scores in the group, a weighted average of the scores in the group, a median of the scores in the group, or some other measure of central tendency. For example, the combined auxiliary score "$CAS_1$" for group "1" may be determined using a weighted average as shown in Relationship (2) below:

$$CAS_1 = \frac{\sum_{t=1}^{T} \gamma_t * AS_i}{\sum_{t=1}^{T} \gamma_t} \qquad \text{Relationship (2)}$$

In Relationship (2), the group includes "T" auxiliary scores and the parameter "$AS_t$" is the value of adjusted auxiliary score "t". The parameter "$\gamma_t$" is a weighting factor for the adjusted auxiliary score "t". Each adjusted auxiliary score can be weighted using a weighting factor for its corresponding auxiliary ranking signal. For example, the content provided may elect to weight conversion rates higher than click-through rates for a content item. In this example, the weighting factor for conversion rates may be greater than the weighting factor for click-through rates.

The ranking score for a particular criterion can be determined based on a product of the primary score and each of the one or more combined auxiliary scores. In determining the ranking score, the combined auxiliary scores can also be weighted. For example, the content item provider may elect to weight performance scores higher than rating scores. In this example, the weighting factor for the combined auxiliary score for the performance scores may be greater than the weighting factor for the rating scores. An example relationship for determining a ranking score "$R_i$" for a criterion "i" is shown below in Relationship (3):

$$R_i = P_i * (1+\alpha CAS_{i1}) * (1+\beta CAS_{i2}) \qquad \text{Relationship (3)}$$

In Relationship (3), criterion "i" has a primary score "$P_i$" and two combined auxiliary scores "$CAS_{i1}$" and "$CAS_{i2}$". Other appropriate numbers of primary scores and/or auxiliary scores can be similarly used in Relationship (3). The parameter "a" is a weighting factor for combined auxiliary score "$CAS_{i1}$" and the parameter "$\beta$" is a weighting factor for combined auxiliary score "$CAS_{i2}$". As shown in Relationship (3), the combined auxiliary scores can be added to a constant value, e.g., a value of one, prior to being multiplied by the primary score. This adjustment to the combined auxiliary scores allows combined auxiliary scores that have sufficient value to boost the ranking score, while not penalizing the ranking score for combined auxiliary scores that have a small value, e.g., a value of zero. For example, a new criterion may not have any performance scores, resulting in a combined performance auxiliary score of zero if the score is not adjusted. This adjustment also prevents global criteria that have high performance scores from dominating rankings for content items that are not related to the global criteria. The value of the constant can be a different value than one. For example, a value greater than one can be used to decrease the effect of higher combined auxiliary scores relative to lower combined auxiliary scores.

At block 214, one or more criteria in the set of distribution criteria is selected for association with the content item based on the ranking scores. For example, the criteria ranking engine 123 may select criteria having the highest ranking scores or each criterion that has at least a specified ranking score. In another example, the content provider for the content item may select the criteria based on the ranking scores. In this example, the content management system 120 may provide data specifying the criteria and their respective ranking scores to the content provider as criteria suggestions. In response, the content provider may select one or more criteria for distributing the content item.

At block 216, the content item is provided in response to receiving data specifying one or more of the selected criteria. Consider, for example, that the selected criteria includes the keyword "bicycle." If a content item request is received that specifies the keyword "bicycle," e.g., for a search query or web page, the content item may be provided in response to the content item request. As described above, an auction may be conducted in response to the content item request. If the content item provider wins the auction for the received content item request, the content item may be provided.

FIG. 3 is a flow diagram of an example process 300 for adjusting auxiliary scores for content item distribution criteria. Operations of the process 300 can be implemented, for example, by a data processing apparatus, such as the content management system 120 of FIG. 1. The process 300 can also be implemented by instructions stored on computer storage medium, where execution of the instructions by a data processing apparatus cause the data processing apparatus to perform the operations of the process 300.

At block 302, a set of auxiliary scores are identified for distribution criteria for a content item. The auxiliary scores can correspond to auxiliary ranking signals for the content item. For example, the auxiliary ranking signals can include click-through rates, click counts, impression counts, conversion rates, conversion counts, page rank scores for web pages, brand scores, user reach, and/or semantic scores (e.g., if not the primary ranking signal) for the distribution criteria.

At block 304, at least a portion of the auxiliary scores are transformed using one or more transformation functions. The auxiliary scores for one or more of the auxiliary ranking signals may exhibit skewness as some of the criteria may have much stronger auxiliary scores for the signal than other criteria. For example, a very popular web page may have many more impressions than an obscure blog. The auxiliary scores for the impression count auxiliary ranking signal may be transformed to reduce the skewness in the scores. For example, a transformation function, such as Log(x), Sqrt(x), or (1−1/(x−a)), where "a" is a constant that is less than "x", may be applied to the impression counts to reduce the amount of skewness in the scores.

The particular transformation function used for a particular auxiliary ranking signal may be based on characteristics of the particular auxiliary ranking signal or the auxiliary scores for the particular auxiliary ranking signal. The transformation function may be selected for an auxiliary ranking signal based on the intrinsic properties of the auxiliary ranking signal. For example, the transformation function may be selected based on an amount of skewness in the auxiliary scores for the auxiliary ranking signal. If the amount of skewness in the auxiliary scores for an auxiliary ranking signal is low (e.g., less than some threshold), the auxiliary scores for the auxiliary ranking signal may not be transformed. For example, click-through rates may have a value between zero and one, and have little skewness. If the amount of skewness in the auxiliary scores for an auxiliary ranking signal is significant (e.g., greater than a threshold), the auxiliary scores may be transformed using a transformation function, e.g., Log(x). For example, some keywords may have billions of impressions while the majority of keywords have hundreds or thousands of impressions. In this example, the impression counts may be transformed so that the impression counts are comparable at the lower ranges (e.g., hundreds and thousands of impressions). If the auxiliary scores still have significant skewness (e.g., greater than a threshold amount of skewness), then the transformation function may be applied multiple times.

In some implementations, only auxiliary ranking scores for auxiliary ranking signals that have a significant amount of skewness, e.g., more than a specified amount of skewness, are transformed. For example, the criteria ranking engine 123 may determine an amount of skewness in the auxiliary ranking scores for each auxiliary ranking signal and compare the amounts of skewness to a specified or threshold amount. If the amount of skewness for a particular auxiliary ranking signal exceeds the specified or threshold amount, the auxiliary scores that correspond to the auxiliary ranking signal may be transformed, e.g., using transformation function.

At block 306, the auxiliary scores for each (or at least a portion of) the auxiliary ranking signals are capped. For example, the auxiliary scores for an auxiliary ranking signal may be capped at a capped value for that auxiliary ranking signal to remove extremely high values. In some implementations, the capped value for a particular auxiliary ranking signal is determined based on the auxiliary scores for the particular auxiliary ranking signal across the distribution criteria. For example, the capped value may be the value at a particular percentile (e.g., 80th, 85th, 90th, or some other percentile) for the auxiliary ranking signals. In another example, the capped value may be a particular percentage above an average or median auxiliary score for the particular auxiliary ranking signal. Auxiliary scores that exceed the capped value for the score's corresponding auxiliary ranking signal may be reduced to the capped value or a value less than the capped value.

At block 308, the auxiliary scores for each auxiliary ranking signal are normalized. The auxiliary scores for each auxiliary ranking signal may be normalized to a common range, such as from zero to one. For example, click-through rates can be normalized to a range of zero to one, and impression counts can be normalized to a range of zero to one. In this way, the auxiliary scores for different auxiliary ranking signals can be compared directly.

At block 310, the auxiliary scores are weighted. The auxiliary scores can be weighted based on weighting factors for the auxiliary ranking signals. For example, a content item provider may specify a weighting factor for each auxiliary ranking signal based on the signal's importance to the content item provider. In this example, the content item provider may specify a greater weighting factor for conversion rates than for click-through rates, for example. The weighting factor for a particular auxiliary ranking signal may be applied to each ranking score that corresponds to the particular auxiliary ranking signal. For example, the weighting factor for conversion rates may be applied to each conversion rate included in the auxiliary scores.

Figure 4:
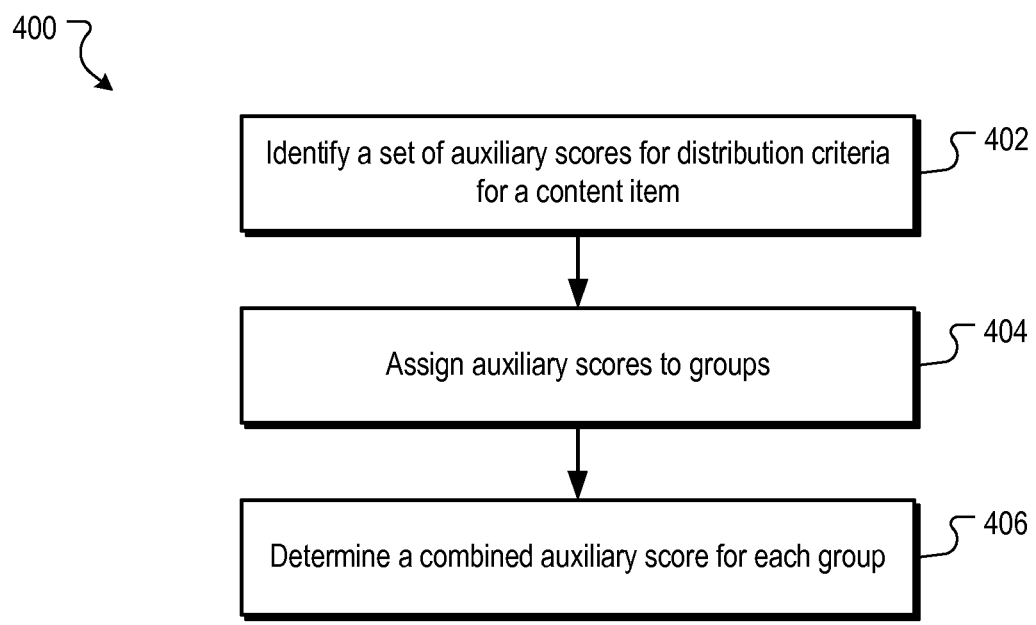
FIG. 4 is a flow diagram of an example process for determining a combined auxiliary score for groups of auxiliary scores.

FIG. 4 is a flow diagram of an example process 400 for determining a combined auxiliary score for groups of auxiliary scores. Operations of the process 400 can be implemented, for example, by a data processing apparatus, such as the content management system 120 of FIG. 1. The process 400 can also be implemented by instructions stored on computer storage medium, where execution of the instructions by a data processing apparatus cause the data processing apparatus to perform the operations of the process 400.

At block 402, a set of auxiliary scores are identified for distribution criteria for a content item. The auxiliary scores can correspond to auxiliary ranking signals for the content item. For example, the auxiliary ranking signals can include click-through rates, click counts, impression counts, conversion rates, conversion counts, page rank scores for web pages, brand scores, user reach, and/or semantic scores (e.g., if not the primary ranking signal) for the distribution criteria.

At block 404, the auxiliary scores for each distribution criterion are assigned to two or more groups for that distribution criterion. In some implementations, the auxiliary scores are assigned to groups based on the type of auxiliary ranking signal for each auxiliary score. For example, a group may be created for performance-related ranking signals (e.g., click-through rates and conversion rates) and another group may be created for content-related ranking signals (e.g., authority scores for web pages). Performance scores can be assigned to the group for performance-related ranking signals and content-related scores can be assigned to the group for content-related ranking signals.

At block 406, a combined auxiliary score is determined for each group and for each criterion. For example, a combined auxiliary score can be determined for a performance-related group for criterion A using performance-related auxiliary scores for criterion A. In addition, a combined auxiliary score can be determined for a content-related group for criterion A using content-related auxiliary scores for criterion A. Similarly, a combined auxiliary score can be determined for a performance-related group for criterion B using performance-related auxiliary scores for criterion B. In addition, a combined auxiliary score can be determined for a content-related group for criterion B using content-related auxiliary scores for criterion B.

The combined auxiliary score for a group can be determined based on a measure of central tendency for the auxiliary scores assigned to the group. For example, the combined auxiliary score for criterion A's performance-related group may be an average, weighted average, or median of the performance-related auxiliary scores assigned to the group.

When using the combined auxiliary scores for a criterion to determine the ranking score for the criterion, the combined auxiliary scores for the criterion can be weighted. For example, the content item provider may place larger weight on performance-related scores than content-related scores. In this example, the combined auxiliary score for the performance-related group may be weighted more than the combined auxiliary score for the content-related group.

Figure 5:
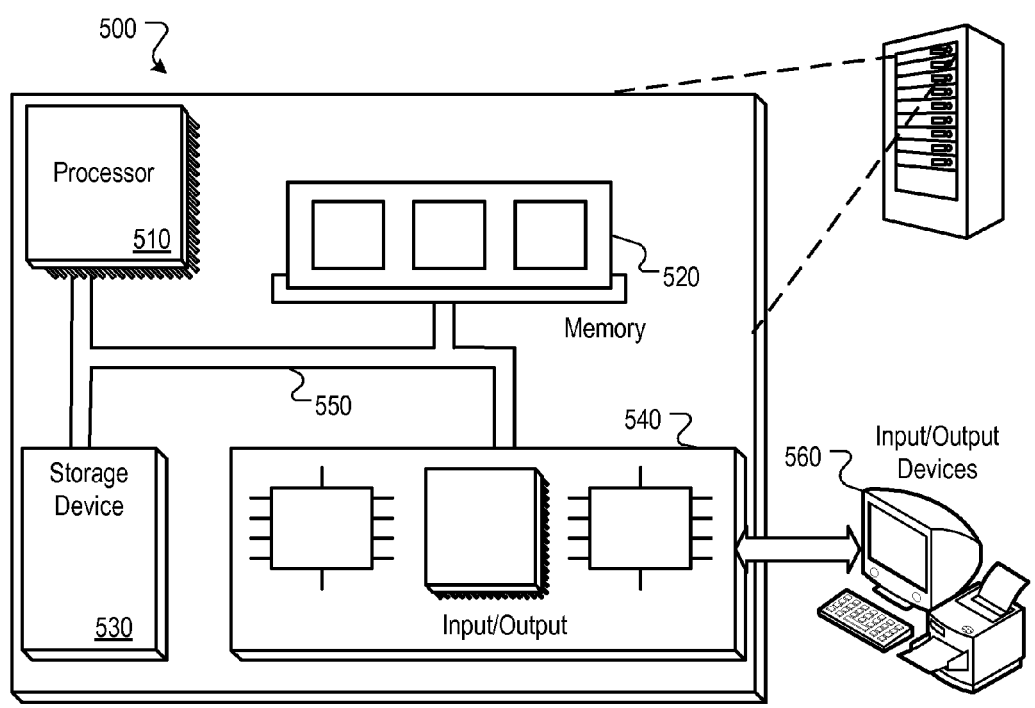
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks. e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

identifying a primary ranking signal and a set of auxiliary ranking signals for ranking a set of criteria for a content item, wherein the primary ranking signal defines a first attribute for one of the criteria in the set of criteria and each auxiliary ranking signal in the set of auxiliary ranking signals a) defines a second attribute for one of the criteria in the set of criteria and b) is different than the primary ranking signal;

for each particular criterion in the set of criteria:
identifying a primary score representing a value of the primary ranking signal for the particular criterion;
identifying a set of auxiliary scores for the particular criterion, each auxiliary score representing a value of an auxiliary ranking signal of the set of auxiliary ranking signals for the particular criterion;
adjusting each auxiliary score in the set of auxiliary scores to generate adjusted auxiliary scores, the adjusting comprising applying, to at least a portion of the auxiliary scores, a transformation function that reduces an amount of skewness among the auxiliary scores that are associated with a particular auxiliary ranking signal from the set of auxiliary ranking signals; and
determining a ranking score for the particular criterion based on a function of the primary score for the particular criterion and the adjusted auxiliary scores, the function suppressing effects of adjusted auxiliary scores for the particular criterion that do not satisfy a specified value and boosting the ranking score using adjusted auxiliary scores for the particular criterion that satisfy the specified value;

selecting one or more criteria in the set of criteria for which to associate the content item based on the ranking score for each particular criterion; and providing the content item in response to receiving data specifying one or more of the selected criteria.

2. The method of claim 1, wherein determining the ranking score for the particular criterion comprises combining the transformed auxiliary scores to generate a combined auxiliary score, wherein the function comprises a function of the primary score and the combined auxiliary score.

3. The method of claim 2, further comprising:
for at least one of the particular criterion in the set of criteria:
determining whether the combined auxiliary score satisfies a specified value, wherein determining the ranking score for the particular criterion comprises increasing the ranking score in response to determining that the combined auxiliary score satisfies the specified value.

4. The method of claim 2, wherein determining the ranking score for the particular criterion comprises:
adding the combined auxiliary score to a constant value to generate an adjusted auxiliary score; and
determining a product of the adjusted auxiliary score and the primary score.

5. The method of claim 1, further comprising:
assigning the auxiliary scores to two or more groups based on a type of auxiliary ranking signal for each auxiliary score;
determining, for each group, a combined auxiliary score for the group based on auxiliary scores assigned to the group; and
applying a respective weighting factor to the combined auxiliary score for the group, wherein the respective weighting factor for a particular group is based on relative importance of the group's auxiliary scores, and wherein the function comprises a function of the primary score and the combined auxiliary score for each group.

6. The method of claim 1, further comprising:
determining, for each particular auxiliary ranking signal, a maximum value of auxiliary scores for the auxiliary ranking signal, the maximum value being based on values of the auxiliary scores for the auxiliary ranking signal across the set of criteria and being less than a highest auxiliary value for the auxiliary ranking signal across the set of criteria;
identifying a particular auxiliary score for the auxiliary ranking signal that represents a value for the auxiliary ranking signal and that has a value that exceeds the maximum value; and
reducing the particular auxiliary score to a value that is equal to or less than the maximum value.

7. The method of claim 1, further comprising normalizing auxiliary scores for each auxiliary ranking signal.

8. A system comprising:
a data store for storing primary scores and auxiliary scores for a set of criteria; and
one or more processors configured to interact with the data store, the one or more processors being further configured to perform operations comprising:
identifying a primary ranking signal and a set of auxiliary ranking signals for ranking the set of criteria for a content item, wherein the primary ranking signal defines a first attribute for one of the criteria in the set of criteria and each auxiliary ranking signal in the set of auxiliary ranking signals a) defines a second attribute for one of the criteria in the set of criteria and b) is different than the primary ranking signal;
for each particular criterion in the set of criteria:
identifying a primary score representing a value of the primary ranking signal for the particular criterion;
identifying a set of auxiliary scores for the particular criterion, each auxiliary score representing a value of an auxiliary ranking signal of the set of auxiliary ranking signals for the particular criterion;
adjusting each auxiliary score in the set of auxiliary scores to generate adjusted auxiliary scores, the adjusting comprising applying, to at least a portion of the auxiliary scores, a transformation function that reduces an amount of skewness among the auxiliary scores that are associated with a particular auxiliary ranking signal from the set of auxiliary ranking signals; and
determining a ranking score for the particular criterion based on a function of the primary score for the particular criterion and the adjusted auxiliary scores, the function suppressing effects of adjusted auxiliary scores for the particular criterion that do not satisfy a specified value and boosting the ranking score using adjusted auxiliary scores for the particular criterion that satisfy the specified value;
selecting one or more criteria in the set of criteria for which to associate the content item based on the ranking score for each particular criterion; and
providing the content item in response to receiving data specifying one or more of the selected criteria.

9. The system of claim 8, wherein determining the ranking score for the particular criterion comprises combining the transformed auxiliary scores to generate a combined auxiliary score, wherein the function comprises a function of the primary score and the combined auxiliary score.

10. The system of claim 9, wherein the one or more processors are further configured to perform further operations comprising:
for at least one of the particular criterion in the set of criteria:
determining whether the combined auxiliary score satisfies a specified value, wherein determining the ranking score for the particular criterion comprises increasing the ranking score in response to determining that the combined auxiliary score satisfies the specified value.

11. The system of claim 9, wherein determining the ranking score for the particular criterion comprises:
adding the combined auxiliary score to a constant value to generate an adjusted auxiliary score; and
determining a product of the adjusted auxiliary score and the primary score.

12. The system of claim 8, wherein the one or more processors are further configured to perform further operations comprising:
assigning the auxiliary scores to two or more groups based on a type of auxiliary ranking signal for each auxiliary score;
determining, for each group, a combined auxiliary score for the group based on auxiliary scores assigned to the group; and
applying a respective weighting factor to the combined auxiliary score for the group, wherein the respective weighting factor for a particular group is based on relative importance of the group's auxiliary scores, and wherein the function comprises a function of the primary score and the combined auxiliary score for each group.

13. The system of claim 8, wherein the one or more processors are further configured to perform further operations comprising:
   determining, for each particular auxiliary ranking signal, a maximum value of auxiliary scores for the auxiliary ranking signal, the maximum value being based on values of the auxiliary scores for the auxiliary ranking signal across the set of criteria and being less than a highest auxiliary value for the auxiliary ranking signal across the set of criteria;
   identifying a particular auxiliary score for the auxiliary ranking signal that represents a value for the auxiliary ranking signal and that has a value that exceeds the maximum value; and
   reducing the particular auxiliary score to a value that is equal to or less than the maximum value.

14. The system of claim 8, wherein the one or more processors are further configured to perform further operations comprising normalizing auxiliary scores for each auxiliary ranking signal.

15. A computer storage medium encoded with a computer program, the program comprising instructions that when executed by data processing apparatus cause the data processing apparatus to perform operations comprising:
   identifying a primary ranking signal and a set of auxiliary ranking signals for ranking a set of criteria for a content item, wherein the primary ranking signal defines a first attribute for one of the criteria in the set of criteria and each auxiliary ranking signal in the set of auxiliary ranking signals a) defines a second attribute for one of the criteria in the set of criteria and b) is different than the primary ranking signal;
   for each particular criterion in the set of criteria:
      identifying a primary score representing a value of the primary ranking signal for the particular criterion;
      identifying a set of auxiliary scores for the particular criterion, each auxiliary score representing a value of an auxiliary ranking signal of the set of auxiliary ranking signals for the particular criterion;
      adjusting each auxiliary score in the set of auxiliary scores to generate adjusted auxiliary scores, the adjusting comprising applying, to at least a portion of the auxiliary scores, a transformation function that reduces an amount of skewness among the auxiliary scores that are associated with a particular auxiliary ranking signal from the set of auxiliary ranking signals; and
      determining a ranking score for the particular criterion based on a function of the primary score for the particular criterion and the adjusted auxiliary scores, the function suppressing effects of adjusted auxiliary scores for the particular criterion that do not satisfy a specified value and boosting the ranking score using adjusted auxiliary scores for the particular criterion that satisfy the specified value;
   selecting one or more criteria in the set of criteria for which to associate the content item based on the ranking score for each particular criterion; and
   providing the content item in response to receiving data specifying one or more of the selected criteria.

16. The computer storage medium of claim 15, wherein determining the ranking score for the particular criterion comprises combining the transformed auxiliary scores to generate a combined auxiliary score, wherein the function comprises a function of the primary score and the combined auxiliary score.

17. The computer storage medium of claim 16, further comprising:
   for at least one of the particular criterion in the set of criteria:
      determining whether the combined auxiliary score satisfies a specified value, wherein determining the ranking score for the particular criterion comprises increasing the ranking score in response to determining that the combined auxiliary score satisfies the specified value.

18. The computer storage medium of claim 16, wherein determining the ranking score for the particular criterion comprises:
   adding the combined auxiliary score to a constant value to generate an adjusted auxiliary score; and
   determining a product of the adjusted auxiliary score and the primary score.

19. The computer storage medium of claim 15, wherein the instructions, when executed by the data processing apparatus, cause the data processing apparatus to perform further operations comprising:
   assigning the auxiliary scores to two or more groups based on a type of auxiliary ranking signal for each auxiliary score;
   determining, for each group, a combined auxiliary score for the group based on auxiliary scores assigned to the group; and
   applying a respective weighting factor to the combined auxiliary score for the group, wherein the respective weighting factor for a particular group is based on relative importance of the group's auxiliary scores, and wherein the function comprises a function of the primary score and the combined auxiliary score for each group.

20. The computer storage medium of claim 15, wherein the instructions, when executed by the data processing apparatus, cause the data processing apparatus to perform further operations comprising:
   determining, for each particular auxiliary ranking signal, a maximum value of auxiliary scores for the auxiliary ranking signal, the maximum value being based on values of the auxiliary scores for the auxiliary ranking signal across the set of criteria and being less than a highest auxiliary value for the auxiliary ranking signal across the set of criteria;
   identifying a particular auxiliary score for the auxiliary ranking signal that represents a value for the auxiliary ranking signal and that has a value that exceeds the maximum value; and
   reducing the particular auxiliary score to a value that is equal to or less than the maximum value.

\* \* \* \* \*